US012583014B2

(12) United States Patent
Jeong et al.

(10) Patent No.: US 12,583,014 B2

(45) Date of Patent: Mar. 24, 2026

(54) NANOPARTICLE HIGH-SPEED COATING

(71) Applicant: Gwangju Institute of Science and Technology, Gwangju (KR)

(72) Inventors: Hyeon-Ho Jeong, Gwangju (KR); Doeun Kim, Gwangju (KR); Jang-Hwan Han, Gwangju (KR); JuHyeong Lee, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 0 days.

(21) Appl. No.: 18/523,999

(22) Filed: Nov. 30, 2023

(65) Prior Publication Data

US 2024/0342750 A1 Oct. 17, 2024

(30) Foreign Application Priority Data

Apr. 17, 2023 (KR) ........................ 10-2023-0050034

(51) Int. Cl.

*B05D 1/06* (2006.01)
*B05D 3/00* (2006.01)

(52) U.S. Cl.

CPC ............... *B05D 1/06* (2013.01); *B05D 3/007* (2013.01); *B05D 2301/30* (2013.01); *B05D 2401/20* (2013.01)

(58) Field of Classification Search

CPC ...... B05D 1/06; B05D 3/007; B05D 2301/30; B05D 2401/20

See application file for complete search history.

(56) References Cited

U.S. PATENT DOCUMENTS

| | | | | |
|---|---|---|---|---|
| 7,232,771 B2 * | 6/2007 | Jacobs | G03G 5/02 438/758 |
| 7,592,269 B2 * | 9/2009 | Jacobs | G03G 5/02 977/901 |
| 2003/0092214 A1 * | 5/2003 | Klauk | H10K 10/84 438/82 |
| 2009/0275788 A1 * | 11/2009 | Bedard | B01J 21/12 585/269 |
| 2014/0314855 A1 * | 10/2014 | Ducheyne | A61K 9/5115 424/490 |
| 2015/0194242 A1 * | 7/2015 | Muscat | B22F 9/24 427/299 |
| 2016/0254395 A1 * | 9/2016 | Jiang | H10F 77/707 257/76 |

FOREIGN PATENT DOCUMENTS

| | | |
|---|---|---|
| KR | 10-2006-0130063 A | 12/2006 |
| KR | 10-2012-0123183 A | 11/2012 |
| KR | 10-2014-0111222 A | 9/2014 |

OTHER PUBLICATIONS

Office Action of Korean Patent Application No. 10-2023-0050034 mailed Feb. 1, 2024.

* cited by examiner

*Primary Examiner* — Dah-Wei D. Yuan
*Assistant Examiner* — Kristen A Dagenais
(74) *Attorney, Agent, or Firm* — Revolution IP, PLLC

(57) ABSTRACT

An example according to the present invention provides a method of electrostatically coating nanoparticles at high speed including: a step S100 of preparing a dispersion solution including the nanoparticles charged with a charge opposite to that of a substrate; a step S200 of adding acid for increasing a proton concentration of the dispersion solution; a step S300 of coating the nanoparticles on the substrate; and a step S400 of removing a solution of the coated substrate.

11 Claims, 6 Drawing Sheets

NANOPARTICLE HIGH-SPEED COATING

BACKGROUND OF THE INVENTION

Field of the Invention

The present invention relates to a technology for inducing strengthening of electrostatic attraction between nanoparticles present in a liquid phase and the surface of a counterpart substrate through pH adjustment, thereby adjusting and transferring (or coating) high-speed formation of nanoparticles.

Description of the Related Art

Nanoparticles refer to particles with at least one axis length of 100 nm or less, and a larger number of atoms compared to bulk materials are located on the surface, thereby exhibiting various specific physical and chemical properties (such as strength, conductivity, catalytic activity, optics, and magnetic force) depending on the size or shape of the particle. This performance is utilized in research on energy (such as catalysts), optical, electronic, and biomedical materials and elements. For example, when producing a thin film by applying metal nanoparticles of gold (Au), silver (Ag), copper (Cu), nickel (Ni), platinum (Pt), lead (Pd), cobalt (Co), and the like to the surface of a substrate by printing or coating, the thin film can be used as a transparent electrode for flexible electronic devices with excellent reproducibility and stability or as a pigment for optical devices. In addition, nanoparticles of iron oxide ($Fe_2O_3$, $Fe_3O_4$, or the like), spinel ferrite ($MnFe_2O_4$, $CoFe_2O_4$, and the like), and ferromagnetic materials (Fe, Co, Ni, and the like) exhibit super-paramagnetism, which can be used for application in magnetic field-based switching or memory devices and application in the medical field of diagnosis and treatment such as drug delivery within the human body and removal of lesion cells. In case of semiconductor nanoparticles (or quantum dots) such as CdS, CdSe, PdSe, InAs, and ZnS, physical properties such as energy band gap can be adjusted by particle size and material composition, so research and development on the semiconductor nanoparticles are ongoing as core material/component technologies for next-generation optical semiconductor elements such as ultra-high-resolution displays and ultra-high-speed optical communications. In this way, nanoparticles can be applied in various fields according to characteristics thereof and are gradually developing into a core technology in various fields. Accordingly, market demand for large-area high-speed nanoparticle coating technology for industrial use is gradually increasing.

Nanoparticles move randomly and collide in the fluid by molecular kinetic energy to change direction and speed, thereby showing Brown motion of irregular movement. Therefore, since nanoparticles always move irregularly, assembling and transferring the nanoparticles to a desired location is a difficult task, and representative examples of technologies in the related art to solve this problem include electrostatic, electrophoretic, and meniscus guided coating.

Electrostatic coating is a manufacturing process of efficiently coating materials by using charged particles in a fluid. Charged nanoparticles are projected toward a conductive workpiece, which is charged opposite to the particle, in the fluid and are then accelerated toward the workpiece by strong static electricity to be self-assembled, and thus a large-area continuous coating process becomes possible. This has the advantage of enabling monolayer nanoparticle coating without additional external devices and energy. In addition, the surface charge can be adjusted through chemical and physical treatment on the nanoparticle and the substrate surface, and thus various types of functions can be imparted. For example, the surface charge is adjusted by proactively attaching a self-assembly monolayer (SAM) organic molecule consisting of thiol, silane, and phosphonate groups to the surface of the nanoparticle. Additionally, special functions such as drug delivery and target material reaction can be added by attaching DNA and proteins. However, the proactive surface treatment and nanoparticle transfer process require consideration of many design variables and process time, and it is not only difficult to coat the surface of the substrate with nanoparticles at high density, but also difficult to control the shape of the transferred nanoparticles and ensure reproducibility.

Electrophoretic coating is one of alternative technologies for shortening the process time and is a method of causing colloidal (nano) particles suspended in a liquid medium to move (that is, electrophoresis) under the influence of an external electric field and coating the counter electrode with the particles, and most of the charged colloidal particles (polymers, pigments, dyes, ceramics, metals, and the like) can be transferred through electrophoresis. However, this method requires different optimized process conditions depending on the area and material of the counter electrode, the coating target material, and the charges, whereby it is difficult to secure coating uniformity, and consumes large external power (energy) whereby it difficult to apply the particles to a large area.

As an alternative to this problem, a meniscus induction coating technology is utilized to regulate a large-area continuous process and high-density attachment of nanoparticles. This coating technology refers to stacking high-performance thin films by using the capillary effect that occurs at a liquid-gas interface. The capillary effect is a phenomenon that occurs when a liquid surface meets a substrate when receiving force in one direction, and the coating technology is a method of gradually lowering the liquid surface at the liquid-solid (substrate) interface opposite the direction of the force to gradually restrict a space where liquid nanoparticles can exist and transferring the liquid nanoparticles to the substrate surface at high density. In this method, coating can be performed while continuously moving the liquid, and thus the large-area continuous process becomes possible. However, there is a coating speed limit on the scale of millimeters per second, and process equipment and costs that can continuously move the liquid in a small amount are required.

The present invention relates to a technology that maximizes coating performance while simplifying conventional electrostatic coating methods. Specifically, by a simple method of increasing the concentration of protons by adding acid into the colloidal aqueous solution in which nanoparticles are dispersed, the release of hydroxyl groups from the substrate surface is induced to strengthen the electrostatic attraction, so a coating speed of 10 times faster than the conventional electrostatic coating process even without surface treatment is implemented. In addition, the effect of buffer ions is selectively weakened, so that the assembly of nanoparticles is selectively induced. In this method, it is possible to add a particle assembly function to the conventional electrostatic coating method, and thus the method can be applied to realize additional optical and electrical performance.

SUMMARY OF THE INVENTION

The present invention is to solve a problem of slow processing speed, which is a disadvantage of uniform coating through electrostatic self-assembly.

The present invention is a technology for adding acid to a nanoparticle dispersion solution, applying the resultant to a substrate, and then removing the solution within a short period of time of less than 1 second and provides a high-speed nanoparticle coating process technology using self-assembly of nanoparticles and a hydroxide ion releasing effect of a substrate surface by supply of protons.

The technical problem to be achieved by the present invention is not limited to the technical problem described above, and other technical problems not described can be clearly understood by those skilled in the art from the description below.

As technical means for achieving the above-described technical problem, an aspect of the present invention provides a method of electrostatically coating nanoparticles at high speed including: a step S100 of preparing a dispersion solution including the nanoparticles charged with a charge opposite to that of a substrate; a step S200 of adding acid to increase a proton concentration of the dispersion solution; a step S300 of coating the nanoparticles on the substrate; and a step S400 of removing a solution of the coated substrate.

The nanoparticle is at least one nanoparticle selected from the group consisting of metals (gold (Au), silver (Ag), copper (Cu), iron (Fe), platinum (Pt), nickel (Ni), cobalt (Co) or alloys of the above metals), metal oxides (silicon dioxide ($SiO_2$), aluminum oxide ($Al_2O_3$), and iron oxide ($Fe_xO_y$)), semiconductor materials (silicon (Si), compounds (CdS, CdSe, PdSe, InAs, ZnS)), polymers (polystyrene and polyaniline), proteins, and biomolecules.

With respect to a size of the nanoparticle, a length thereof in one axis may be 100 nm or less.

The substrate is a material group from the group consisting of polymers, metals, oxides, and fluorinated compounds, in which a surface potential changes depending on pH of a surrounding solution, whereby a sign of the potential is reversed.

A type of acid specified above may be at least one acid selected from the group consisting of hydrochloric acid (HCl), nitric acid ($HNO_3$), iodic acid (HI), perchloric acid ($HClO_4$), carbonic acid ($H_2CO_3$), and thiocyanic acid (HSCN).

The acid concentration in the solution may be 0.1 to 5 mM.

The invention may be characterized in that assembly of the nanoparticle may be controlled according to a degree of an increase in the acid concentration between the range of the acid concentration of 0.1 to 5 mM.

In step S200, the dispersion solution further contains a buffer solution, and the nanoparticles may be assembled into a molecular form of particles of dimers, trimers, and oligomers depending on an increase in the acid concentration between the range of the acid concentration of 0.1 to 5 mM.

In step S300, coating time may be 1 to 200 seconds. In step S300, the coating method may be a coating method performed by electrostatic self-assembly.

Step S400 may further include a removing method for a short period of time of less than 10 seconds including a solution washing method, in addition to a removing method with high-pressure gas.

When coating is performed for less than 60 seconds according to the method of electrostatically coating nanoparticles at high speed, the nanoparticles may be coated on an area of about 3% to 45% with respect to the unit area.

DETAILED DESCRIPTION OF THE PREFERRED EMBODIMENTS

Figure 1:
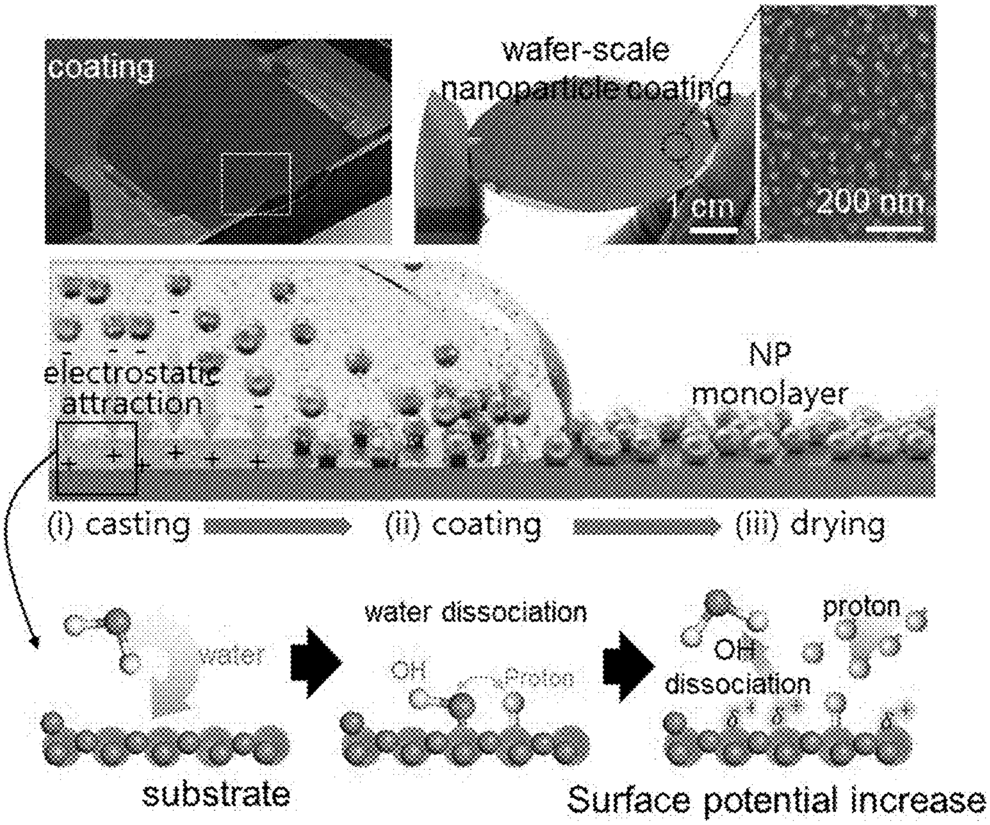
FIG. 1 is a diagram illustrating a method of electrostatically coating nanoparticles at high speed according to Examples 1 to 5 and Comparative Example 1.
Figure 2:
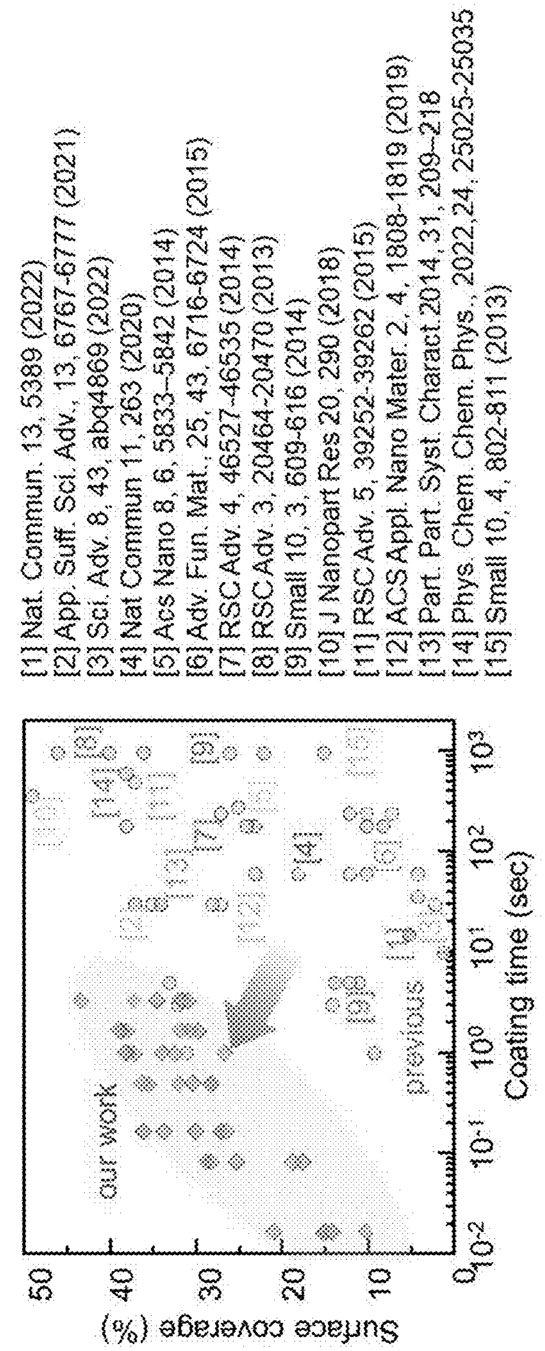
FIG. 2 is a graph showing an effect when a method of electrostatically coating nanoparticles at high speed according to the present invention compared with the nanoparticle electrostatic coating technology in the related art.

Hereinafter, the present invention is more specifically described. However, the present invention can be implemented in various different forms, the present invention is not limited to the embodiments described herein, and the present invention is only defined by the claims to be described below.

In addition, the terms used in the present invention are only used to describe specific embodiments and are not intended to limit the present invention. Singular expressions include plural expressions unless the context clearly dictates otherwise. In the entire specification of the present invention, 'including' a certain element means to further include other elements rather than excluding other elements, unless specifically stated to the contrary.

A first aspect example of the present application provides a method of electrostatically coating nanoparticles at high speed and including: a step S100 of preparing a dispersion solution including the nanoparticles charged with a charge opposite to that of a substrate; a step S200 of adding acid to increase a proton concentration of the dispersion solution; a step S300 of coating the nanoparticles on the substrate; and a step S400 of removing a solution of the coated substrate.

Hereinafter, a method of electrostatically coating nanoparticles at high speed according to the first aspect of the present application is specifically described.

According to an embodiment of the present application, the nanoparticle may be at least one nanoparticle selected from the group consisting of metals (gold (Au), silver (Ag), copper (Cu), iron (Fe), platinum (Pt), nickel (Ni), cobalt (Co) or alloys of the above metals), metal oxides (silicon dioxide ($SiO_2$), aluminum oxide ($Al_2O_3$), and iron oxide ($Fe_xO_y$)), semiconductor materials (silicon (Si), compounds (CdS, CdSe, PdSe, InAs, ZnS)), polymers (polystyrene and polyaniline), proteins, and biomolecules.

According to an embodiment of the present application, with respect to a size of the nanoparticle, a length thereof in one axis may be 100 nm or less. Here, one axis does not refer to an axis of a specific side of the nanoparticle but refer to an axis that can be measured from any direction and is not limited.

According to an embodiment of the present application, with respect to a size of the nanoparticle, a length thereof in one axis may be 40 nm or more, 45 nm or more, 70 nm or more, 75 nm or more, 80 nm or more, 85 nm or more, and 90 nm or more, may be 100 nm or less, 95 nm or less, 80 nm or less, 75 nm or less, 70 nm or less, 65 nm or less, and 60 nm or less, and is most preferably 100 nm or less. When the length is less than the above range, sufficient coating may not be achieved on the substrate due to the particle size being too small. When the length is more than the above range, the nanoparticle size may not be satisfied, and the coating layer may be thicker than necessary.

According to an embodiment of the present application, in step S200, anions may be present on the surfaces of the nanoparticles charged with a charge opposite to that of the substrate.

According to an embodiment of the present application, a type of acid to be used to increase an acidity may be at least one acid selected from the group consisting of hydrochloric acid (HCL), nitric acid ($HNO_3$), iodic acid (HI), perchloric acid ($HClO_4$), carbonic acid ($H_2CO_3$), and thiocyanic acid (HSCN), but is not limited.

According to an embodiment of the present application, due to the dissociation of water attached to the surface of the substrate, ions are separated into positive charges (protons, $H^+$) and negative charges (hydroxyl groups, $OH^-$). The separated ions are electrostatically adsorbed to the surface of the substrate existing in water to form a bond, and surface potentials are formed depending on the surface state of the material. However, if the proton concentration is increased by adding acid in the solution, the hydroxide ions on the substrate are released due to the excessively injected protons, thereby causing a phenomenon that the surface is reversed to a positive surface potential value.

Therefore, since an electrostatic potential difference increase between the negatively charged nanoparticles and the positively charged surface in a solution with low acidity, the particles are drawn to the surface through electrostatic attraction, so that high-speed nanoparticle coating can be performed. According to large-area high-speed particle coating using the same, a surface adsorption rate of up to 14% can be secured within one second and can have a coating speed faster about 10 times or more than the technology in the related art.

According to an embodiment of the present application, the concentration of added acid may be 0.1 mM or more, 0.2 mM or more, 0.3 mM or more, 0.5 mM or more, 1.0 nm or more, 1.5 mM or more, 2.0 mM or more, 2.4 mM or more, and 2.8 mM or more, and may be 5.0 mM or less, 4.5 mM or less, 4.0 mM or less, 3.5 mm or less, 3.0 mM or less, 2.8 mM or less, or 2.4 mM or less, and the most preferable concentration range is 0.1 to 5 mM. If the concentration is less than the range described above, it is difficult to confirm that the acid is sufficiently contained, and coating may not be performed smoothly. If the concentration is more than the range described above, unnecessarily excess ions may be used, thereby being inefficient.

According to an embodiment of the present application, in step S300, coating time may be 1 to 200 seconds and most preferably 1 to 60 seconds. If the coating time is less than the range described above, coating may not be performed sufficiently. If the coating time is more than the range described above, it may take an unnecessarily long period of time, thereby being undesirable in terms of energy efficiency.

According to an embodiment of the present application, in step S300, the coating method may be a self-assembly coating method using electrostatic attraction.

According to an embodiment of the present application, the electrostatic self-assembly method is a coating method that can control the thickness and structure of a thin film at the molecular level in a very simple process.

According to an embodiment of the present application, the electrostatic self-assembly method is used in which particles are adsorbed to the substrate surface due to the electrostatic attraction between the positive charges on the substrate surface and the negative charges of the nanoparticles when a substrate of $MgF_2$, $HfO_2$, or the like of which the surface is positively charged is immersed in a dispersion solution of nanoparticles that are negatively charged. In addition, the substrate is a material group from the group consisting of materials such as polymers, metals, oxides, and fluorinated compounds, in which a surface potential changes depending on pH of a surrounding solution, whereby a sign of the potential is reversed.

According to an embodiment of the present application, in step S400, a method of removing the solution of the coated substrate may be performed by using the air (air-blow).

According to an embodiment of the present application, as a solution removing method (air-blow) method using the air, any of the commonly used air guns (air blow gun) may be used.

According to an embodiment of the present application, in step S400, in addition to a removing method using high-pressure gas, a removal method for a short period of time of less than 10 seconds including a solution washing method may be further included. If the step is performed for a period of time of less than the range described above, the nanoparticle dispersion solution on the substrate may not be sufficiently removed. If the step is performed for a period of time of more than the range described above, it is inefficient in terms of energy efficiency.

According to an embodiment of the present application, when coating is performed for less than 60 seconds according to the method of electrostatically coating nanoparticles at high speed, the nanoparticles may be coated on an area of 40% in maximum with respect to the unit area, and when coating is performed for less than 200 seconds, the nanoparticles may be coated on an area of 45% with respect to the unit area.

According to an embodiment of the present application, plasmonic metasurfaces can be produced by using the high-speed nanoparticle coating technology, and this can be applied to large-area color filters, high-resolution painting, molecular and cell visualization, outdoor displays, and the like.

Hereinafter, examples of the present invention are specifically described so that those skilled in the art can easily implement the examples. However, the present invention may be implemented in many different forms and is not limited to the examples described herein.

Example 1: Coating Method Using Nanoparticle Dispersion Solution with HCl Concentration of 0.1 mM After a dispersion solution configured with gold nanoparticles to which hydrochloric acid with the concentration of 0.1 mM was added was prepared, the substrate was uniformly coated with the dispersion solution by electrostatic self-assembly. After uniform application of the gold nanoparticles was confirmed, the applied nanoparticle dispersion solution was removed by using the air-blow method.

Example 2: Coating Using Nanoparticle Method Dispersion Solution with HCl Concentration of 1.0 mM After the dispersion solution configured with the gold nanoparticles to which hydrochloric acid with the concentration of 1.0 mM was added was prepared, the substrate was uniformly coated by the electrostatic self-assembly. After uniform application of the gold nanoparticles was confirmed, the applied nanoparticle dispersion solution was removed by using the air-blow method.

Example 3: Coating Method Using Nanoparticle Dispersion Solution with HCl Concentration of 2.5 mM After the dispersion solution configured with the gold nanoparticles to which hydrochloric acid with the concentration of 2.5 mM was added was prepared, the substrate was uniformly coated by the electrostatic self-assembly. After uniform application of the gold nanoparticles was confirmed, the applied nanoparticle dispersion solution was removed by using the air-blow method.

Example 4: Coating Method Using Nanoparticle Dispersion Solution with HCl Concentration of 5 mM After the dispersion solution configured with the gold nanoparticles to which hydrochloric acid with the concentration of 5 mM was added was prepared, the substrate was uniformly coated by the electrostatic self-assembly. After uniform application of the gold nanoparticles was confirmed, the applied nanoparticle dispersion solution was removed by using the air-blow method.

Example 5

$MgF_2$ and $HfO_2$ substrates were prepared, hydrochloric acid was added stepwise, and electrostatic surface potentials of the substrates that changed with the pH decrease were measured. Therefore, experimental results that the surface potential is converted to a positive value due to the reaction of release of hydroxyl groups due to dissociation of water and addition of acid as described above can be confirmed.

Comparative Example 1: Coating Method Using Nanoparticle Dispersion Solution to which Acid is not Added After a dispersion solution configured with pure gold nanoparticles which did not contain acid was prepared, the substrate was uniformly coated by electrostatic self-assembly. After uniform application of the gold nanoparticles was confirmed, the applied nanoparticle dispersion solution was removed by using the air-blow method.

Experimental Example 1: Nanoparticle Coating Coverage Result

There are generally two implementation principles for the high-speed nanoparticle coating technology according to an embodiment of the present application. The first principle is to accelerate a coating speed by increasing an electrostatic potential difference between the substrate and the particles caused by attachment or release of hydroxyl groups to or from the substrate surface by increasing the acid concentration in the solution. In general, when water or vapor approaches a solid surface at room temperature, water molecules dissociate into positive charges (protons, $H^+$) and negative charges (hydroxyl groups, $OH^-$) due to water dissociation and form surface charges on the substrate. These hydroxyl groups are naturally generated to preserve the electrostatic neutrality of solid surfaces in aqueous environments. The surface charge of the substrate is not fixed but is determined by changes in the pH value of the surrounding solution. When acid is added to the solution, and thus a high concentration of protons ($H^+$) is present, the hydroxyl groups are released from the surface to stabilize the surface energy. Therefore, as the acid concentration increases, the potential of the surface is reversed from negative charges to positive charges.

On the other hand, the nanoparticles are charged by ions and polar molecules in the solution surrounding the particles. In general, the potentials of nanoparticles appear as a diffuse electrical double-layer including an ion adsorption layer by counter ions and an ion diffusion layer that is present above the ion adsorption layer until the steady state arrangement is reached. Positively or negatively charged nanoparticles in a polar solvent migrate to a surface with a direction opposite to the sign of the surface potential, and this migration is defined as electrostatic attraction. The electrostatic attraction can be expressed by Calculation Equation 1 below.

$$\Delta E=-q\Delta V \quad \text{[Calculation Equation 1]}$$

In Calculation Equation 1, AE represents an amount of change in the electrical energy of the nanoparticles, q represents a charge amount of the nanoparticles, and AV represents a potential difference between the nanoparticles and the substrate. In nature, charged nanoparticles are attached to a substrate surface to lower the energy for stabilization. Therefore, if the potential difference between the substrate surface and the particles is adjusted to increase, the electrostatic attraction between the particles and the substrate can be strengthened. Through these interactions, the coating speed of nanoparticles can be accelerated based on the enhanced electrostatic attraction.

Figure 6:
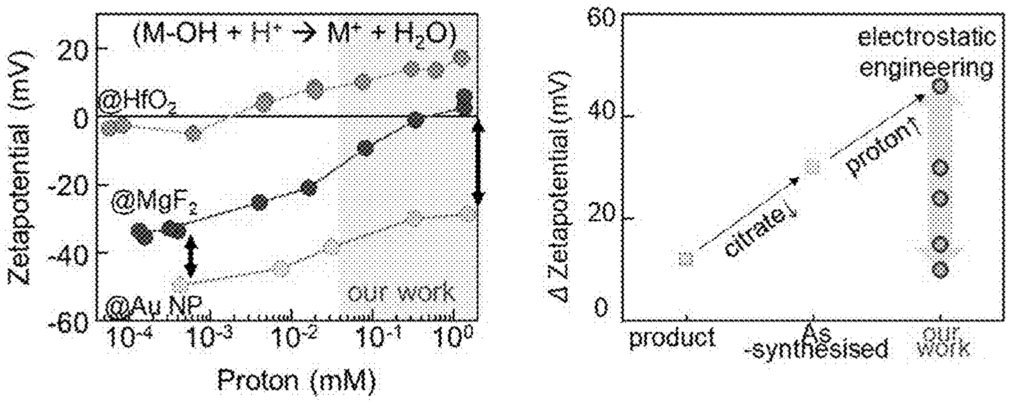
FIG. 6 is surface potential measurement data showing a phenomenon in which a substrate potential is reversed due to dissociation of water and release of a hydroxyl group by the added acid in the solution of Experimental Example 1 and data showing potential measurement results of gold nanoparticles in a graph.
Figure 9:
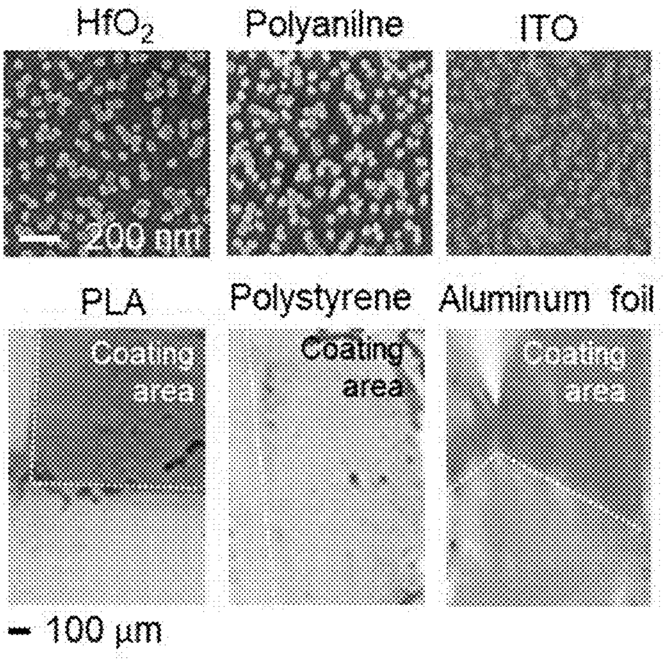
FIG. 9 shows scanning electron microscopy (SEM) results a of nanoparticle coating process on gold nanoparticles according to various substrates ($HfO_2$, polyaniline, ITO) used in Experimental Example 1 and digital images of substrates of PLA (polylactic acid), polystyrene, and aluminum foil of which colors are changed due to nanoparticle attachment.

Hereinafter, according to the first principle of the present application, FIG. 1 is a schematic diagram expressing the principle of dissociation of water molecules and releasing of hydroxyl groups under acidic conditions in the high concentration, and FIG. 6 is experimental data showing changes in the substrate surface potential when the proton concentration is increased by gradually adding acid into the solution. On an $MgF_2$ surface and an $HfO_2$ surface, as the proton concentrations increase, potentials are reversed respectively at about pH 3.5 and 5.7. Also, as pH decreases, the potential differences from the nanoparticles increase. As substrate materials of which a surface potential can be reversed depending on a proton concentration of the surrounding solution that is identical to an aspect of FIG. 4, all material groups of polymers, metals, oxides, fluorinated compounds, and the like, as can be seen from the aspect of FIG. 9, can be used without limitations. Also, since the acid added to decrease the pH is not affected by the type, it can be seen that the effect is not caused by specific acid. In conclusion, the increased potential difference between the substrate and the particles shows that the coating speed increases depending on the acid concentration in FIG. 3.

The second principle for implementing the high-speed nanoparticle coating technology according to an embodiment the present application is to regulate the shape and coating speed of the nanoparticles to be coated by using the buffer ion effect. Gold nanoparticles typically exist in a solution containing CTAB (cetrimonium bromide) and sodium citrate ions, and the molecules act as a surfactant that helps the dispersion stability of the nanoparticles and simultaneously act as buffer ions. The buffer solution containing buffer ions refers to a solution of which the hydrogen ion concentration (pH) does not significantly change due to the common ion effect even when acid or base is added. The applicable pH range varies depending on the type of buffer ion, and in the case of citrate, the solution acts as a buffer solution in the range of pH 2.2 to 6.5.

In the first principle, the high-concentration acid condition is required in order to increase the difference between the surface charge of the substrate and the potential value of the nanoparticles and strengthen the electrostatic attraction between the particles and the substrate. However, below pH 2.2, citrate ions cannot act as buffer ions and surfactants, and the charge (zeta potential) of the nanoparticles increases due to an increase in the concentration of surrounding ions, whereby the dispersion stability of the particles become unstable, and thus particle assembly in a molecular forms of a dimer, a trimer, and the like becomes possible. Therefore, an appropriate pH range is required to regulate high-speed nanoparticle coating and assembly of nanoparticles.

Figure 4:
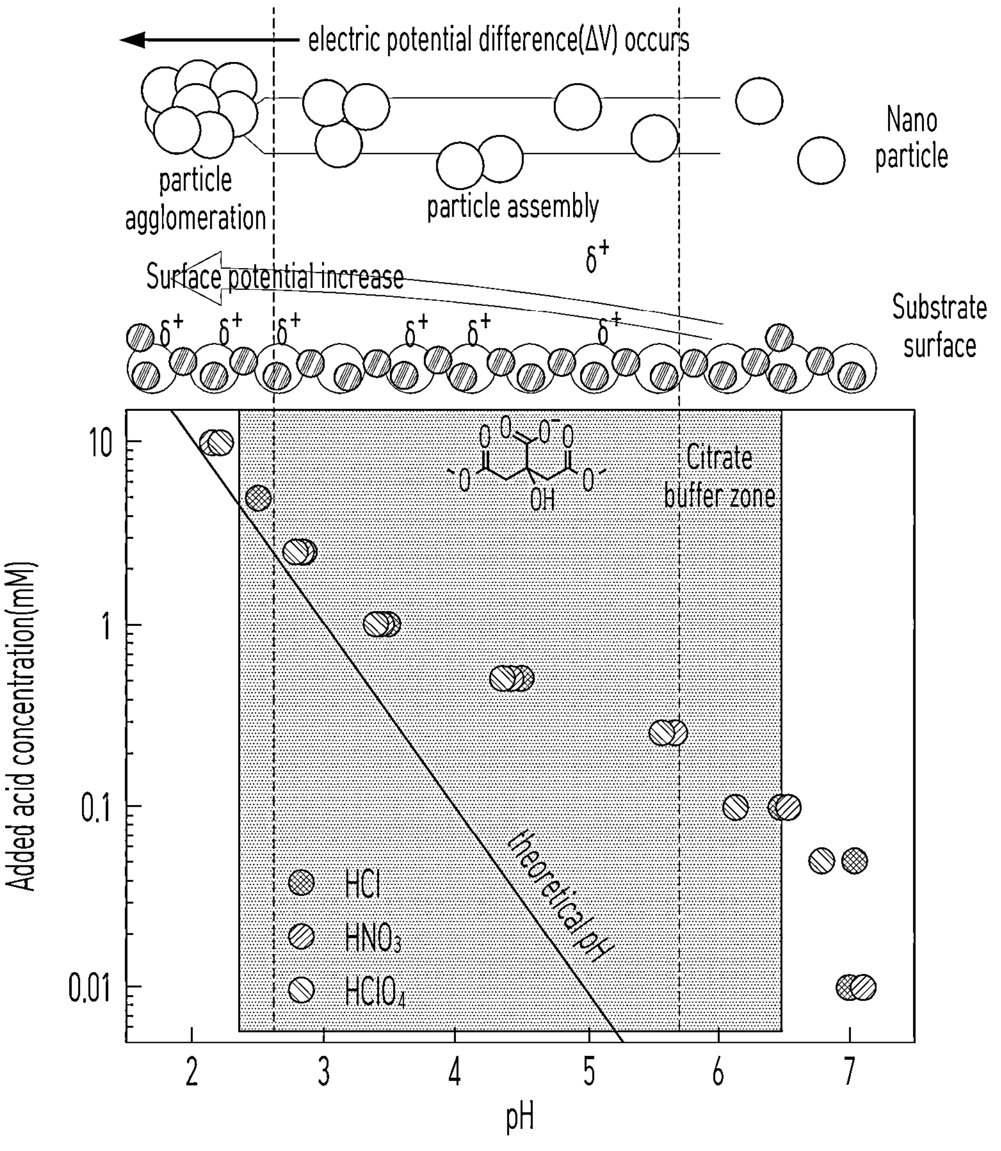
FIG. 4 is data showing a phenomenon that pH of buffer ions in a solution of Experimental Example 1 gradually changes in response to added acid and shows schematic diagrams of effects generated on nanoparticles and the substrate surface according to concentrations of the added acid, respectively.

Hereinafter, with respect to the second principle of the present application, FIG. 4 is a schematic diagram showing experimental data showing the buffering effect according to the addition of acid by a citrate ion solution of 0.25 mM and the pH status of the particles and the substrate.

Figure 5:
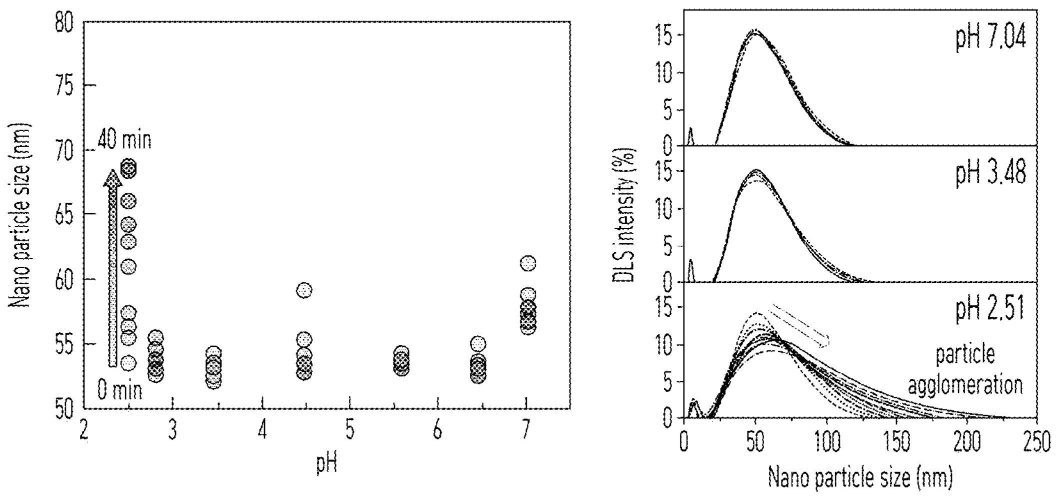
FIG. 5 is data which is a result of analyzing sizes of nanoparticles in a dispersion liquid when pH decreases due to an increase in the acid concentration in the solution of Experimental Example 1 and shows that nanoparticle aggregation occurs over time and sizes of nanoparticles tend to increase when pH of a solution surrounding nanoparticles is 2.51 or less.

According to the aspects of FIGS. 4, 5, and 6, if the pH is decreased to 2.2 or less, it is expected that the buffering effect of citrate ions is decreased, and the charge (zeta potential) of gold nanoparticles is increased to −30 mV or more as the concentration of surrounding ions increases. Therefore, rapid agglomeration of particles occurs. On the other hand, when the pH is 6.5 or more according to the aspects of FIGS. 4 and 5, the charge of the gold nanoparticle is maintained to −48 mV or less, thereby securing the dispersion stability of the gold nanoparticles. However, since the difference between the potential values of the substrate surface charge and the nanoparticle is small, the electrostatic attraction is weak, and thus it is difficult to improve the coating speed.

Figure 3:
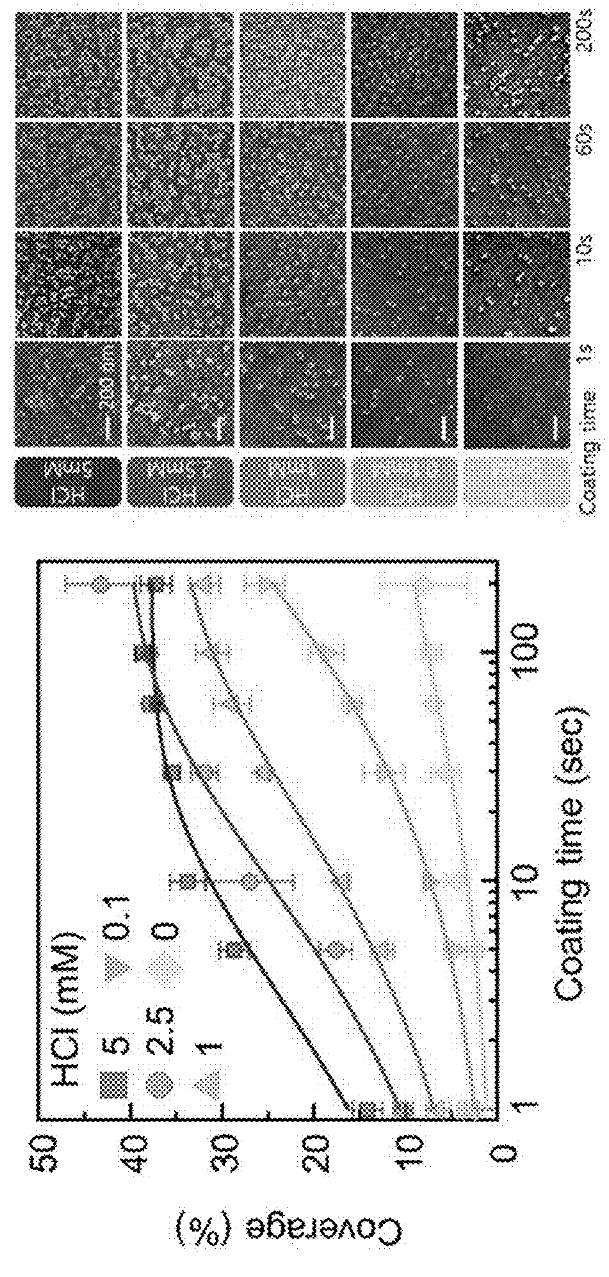
FIG. 3 is data showing a graph of coating coverages according to a pH change, that is, an acidity increase, according to a proton (H+) concentration by adding hydrochloric acid in Examples 1 to 4 and Experimental Example 1 and FESEM images of respective surfaces.

In the aspects of FIGS. 3, 5, and 6, in the area where pH is 2.5 to 6.5, while the acid concentration in the solution is increased, the ratio of nanostructures in the molecular form is increased, and thus it is confirmed that the size of the nanoparticle is increased and the attached nanoparticles are assembled. In this area, it is experimentally shown that a large difference between the substrate surface charges and the potential values of the nanoparticles can be maintained, and simultaneously, particle assembly of a dimer, a trimer, and the like by controlling the dispersion stability of the nanoparticles can be performed. In conclusion, the second principle of the present invention is that it is possible to optimize the technology for designing and manufacturing the shape of nanoparticles and coating the surface with the nanoparticles at high speed by adjusting the area of the buffer ion and the concentration of protons.

1. SEM Analysis Results

FIG. 3 shows scanning electron microscopy (SEM) results of Examples 1 to 6 and Comparative Example 1.

With respect to FIG. 3, it can be confirmed that coating with the metal nanoparticles was: performed uniformly within a short period of time by the added protons, and it can be visually confirmed that as the concentration of the added protons was higher, the more nanoparticles (that is, high surface adsorption rate) were applied.

2. Coating Coverage Change Per Nanoparticle Size

Figure 7:
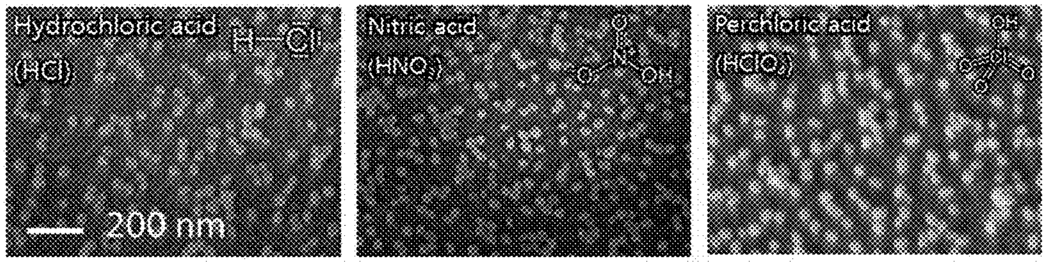
FIG. 7 shows scanning electron microscopy (SEM) results with respect to gold nanoparticle coating results according to the type of the added acid in Experimental Example 1.

The coating coverages of the substrate coated dispersion solutions with the volumetric ratio concentration of the nanoparticles in the solution fixed to 0.1 v %, and having gold nanoparticles having average particle sizes of 40 nm, 50 nm, 60 nm, and 80 nm, respectively, were measured to show the results of FIG. 7.

Figure 8:
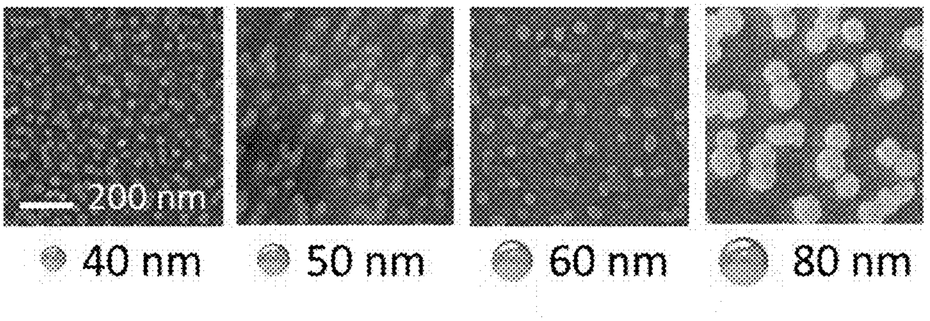
FIG. 8 shows scanning electron microscopy (SEM) results with respect to the gold nanoparticles used in Experimental Example 1 for nanoparticle sizes.

With reference to FIG. 8, regardless of the length of the diameter of the nanoparticle, if acid is once added and the proton concentration is high, it is possible to achieve a high surface adsorption rate of the coating of the nanoparticles for a short period of time compared with conventional technologies in the related art can be achieved.

According to an embodiment of the present invention, an electrostatic coating method for electrostatically bonding particles and a substrate charged with opposite charges and attaching the particles to a substrate surface can be used.

According to an embodiment of the present invention, a method of increasing a proton concentration by increasing acidity in a colloidal aqueous solution where the nanoparticles are dispersed can achieve a coating speed more than 10 times higher than that of electrostatic coating in the related art, and assembly of nanoparticles are intentionally regulated so that the substrate can be coated.

According to an embodiment of the present invention, if a single layer coating of the nanoparticles can be applied on a large area in an industrial scale at high speed by a solution process, the single layer coating can be expected to be applied to various large-scale IT devices such as displays and smart windows and can also be applied in the biological field such as biochip diagnostic devices.

According to an embodiment of the present invention, competitiveness in the optical device technology can be secured by implementing active dichroism using a bidirectional electrochromic metasurface.

The effects of the present invention are not limited to the effects described above and should be understood to include all effects that can be inferred from the configuration of the invention described in the description or claims of the present invention.

The description of the present invention described above is provided for illustrative purposes, and those skilled in the art will understand that the present invention can be easily modified into other specific forms without changing the technical idea or essential features of the present invention. Therefore, the embodiments described above should be understood in all respects as illustrative and not restrictive. For example, each component described as unitary may be implemented in a distributed manner, and similarly, components described as distributed may also be implemented in a combined form.

The scope of the present invention is indicated by the claims described below, and all changed or modified forms derived from the meaning and scope of the claims and equivalent concepts thereof should be construed as being included in the scope of the present invention.

What is claimed is:

1. A method of electrostatically coating nanoparticles, comprising:

a step S100 of preparing a dispersion solution including nanoparticles and a buffer solution, wherein the nanoparticles are negatively charged and a substrate is formed of a material having a surface potential that is pH responsive;

a step S200 of adding an acid to the dispersion solution to lower a pH of the solution to a pH in the range of about 2.2 to about 4.0, wherein the addition of the acid causes hydroxyl groups to dissociate from a surface of the substrate, thereby reversing a sign of the surface potential of the substrate from negative to positive;

a step S300 of coating the nanoparticles on the substrate, wherein the coating is driven by electrostatic attraction between the positively charged substrate surface; and the negatively charged nanoparticles; and a step S400 of removing the dispersion solution from the coated substrate, wherein a buffering action of the buffer solution is weakened within the pH range of about 2.2 to about 4.0, thereby causing the nanoparticles to assemble into molecular clusters including at least one of dimers, trimers, and oligomeric forms.

2. The method of electrostatically coating nanoparticles according to claim 1, wherein the nanoparticle is at least one nanoparticle selected from the group consisting of gold (Au), silver (Ag), copper (Cu), iron (Fe), platinum (Pt), nickel (Ni), cobalt (Co), alloys thereof, silicon dioxide (SiO2), aluminum oxide (Al2O3), iron oxide (FexOy), silicon (Si), CdS, CdSe, PdSe, InAs, ZnS, polystyrene, and polyaniline.

3. The method of electrostatically coating nanoparticles according to claim 1, wherein, with respect to a size of the nanoparticle, a length of the nanoparticles in one axis is 100 nm or less.

4. The method of electrostatically coating nanoparticles according to claim 1, wherein the substrate is a material group from the group consisting of polymers, metals, oxides, and fluorinated compounds, in which a surface potential changes depending on pH of a surrounding solution, whereby a sign of the potential is reversed.

5. The method of electrostatically coating nanoparticles according to claim 1, wherein a type of acid specified above is at least one acid selected from the group consisting of hydrochloric acid (HCl), nitric acid ($HNO_3$), iodic acid (HI), perchloric acid ($HClO_4$), carbonic acid ($H_2CO_3$), and thiocyanic acid (HSCN).

6. The method of electrostatically coating nanoparticles according to claim 1, wherein the concentration of an acid in the solution is 0.1 to 5 mM.

7. The method of electrostatically coating nanoparticles according to claim 1, wherein the concentration of acid in the solution is between 0.1 and 5 mM, and assembly of the nanoparticle is controlled according to a degree of an increase in the acid concentration.

8. The method of electrostatically coating nanoparticles according to claim 1, wherein, in step S300, coating time is 1 to 200 seconds.

9. The method of electrostatically coating nanoparticles according to claim 1, wherein in step S300, the coating method is a coating method performed by electrostatic self-assembly.

10. The method of electrostatically coating nanoparticles according to claim 1, wherein step S400 further includes a removing method for a short period of time of less than 10 seconds including a solution washing method, in addition to a removing method with high-pressure gas.

11. The method of electrostatically coating nanoparticles according to claim 1, wherein, when coating is performed for less than 60 seconds according to the method of electrostatically coating nanoparticles, the nanoparticles are coated on an area of about 3% to 45% with respect to the unit area.

* * * * *